United States Patent [19]

Hoppe et al.

[11] Patent Number: 4,838,071

[45] Date of Patent: Jun. 13, 1989

[54] METHOD OF DETERMINING THE FILLING CAPACITY OF AND CALIBRATING A PNEUMATIC CONVEYING ARRANGEMENT

[75] Inventors: Ernst Hoppe, Welver; Franz-Josef Adrian, Lippetal, both of Fed. Rep. of Germany

[73] Assignee: Krupp Polysius AG, Fed. Rep. of Germany

[21] Appl. No.: 187,306

[22] Filed: Apr. 28, 1988

[30] Foreign Application Priority Data

May 15, 1987 [DE] Fed. Rep. of Germany ....... 3716427

[51] Int. Cl.$^4$ .............. G01F 13/00; G01F 25/00; B65G 53/18; B65G 53/66
[52] U.S. Cl. ............................ 73/3; 73/865.9; 406/34; 406/143
[58] Field of Search ............ 73/3, 1 R, 1 H, 865.9; 406/34, 142, 143, 123, 14, 30, 32

[56] References Cited

U.S. PATENT DOCUMENTS

| | | | |
|---|---|---|---|
| 3,964,793 | 6/1976 | Volpeliere | 406/138 X |
| 4,029,365 | 6/1977 | Ahrens et al. | 406/142 X |
| 4,345,858 | 8/1982 | Barlow | 222/77 X |
| 4,381,897 | 5/1983 | Arbeletche et al. | 406/120 X |
| 4,545,704 | 10/1985 | Heinemann | 406/143 X |
| 4,586,386 | 5/1986 | Hollstein et al. | 73/865.9 X |
| 4,701,080 | 10/1987 | Van Aalst | 406/171 X |
| 4,703,957 | 3/1988 | Adrian | 406/142 |

FOREIGN PATENT DOCUMENTS 219744 4/1987 European Pat. Off. .

Primary Examiner—Tom Noland
Attorney, Agent, or Firm—Learman & McCulloch

[57] ABSTRACT

The invention relates to a method of determining the filling capacity of a pneumatic conveying arrangement by three pressure measurements. The invention also relates to a method of calibrating a pneumatic conveying arrangement using this determination of the filling capacity. These measurements are conveying pressure, pressure at the top of the vessel from which the material is conveyed, and pressure at the top of the vessel to which the material is conveyed.

6 Claims, 2 Drawing Sheets

METHOD OF DETERMINING THE FILLING CAPACITY OF AND CALIBRATING A PNEUMATIC CONVEYING ARRANGEMENT

The invention relates to a method for determining the filling capacity of a pneumatic conveying arrangement and a method for calibrating a pneumatic conveying arrangement using the method according to the invention for determining the filling capacity.

BACKGROUND OF THE INVENTION

In the past the filling capacity of a pneumatic conveying arrangement was generally determined by weighing the pneumatic conveying arrangement on weighing cells. The expenditure on design and construction and measuring techniques which this necessitates is considerable, since certain disruptive forces are contained in the signal from the weighing cells.

EP-A-219 744 relates to a method for calibrating a pneumatic conveying arrangement in which the delivery of material is interrupted and a numeric integration of the difference between the conveying pressure and the empty resistance is carried out and the reduction in the filling weight occurring in a specific time span is determined. The filling weight is obtained in the aforementioned manner by weighing the pneumatic conveying arrangement.

The object of the invention is to develop a method of determining the filling capacity of a pneumatic conveying arrangement (and a method based thereon for calibrating the pneumatic conveying arrangement) which is distinguished by a low expenditure of design and construction and measuring techniques and a sufficient degree of accuracy for the practical requirements.

THE DRAWINGS

One embodiment of the invention is explained in greater detail below with the aid of the drawings, in which.

DETAILED DESCRIPTION

Figure 1:
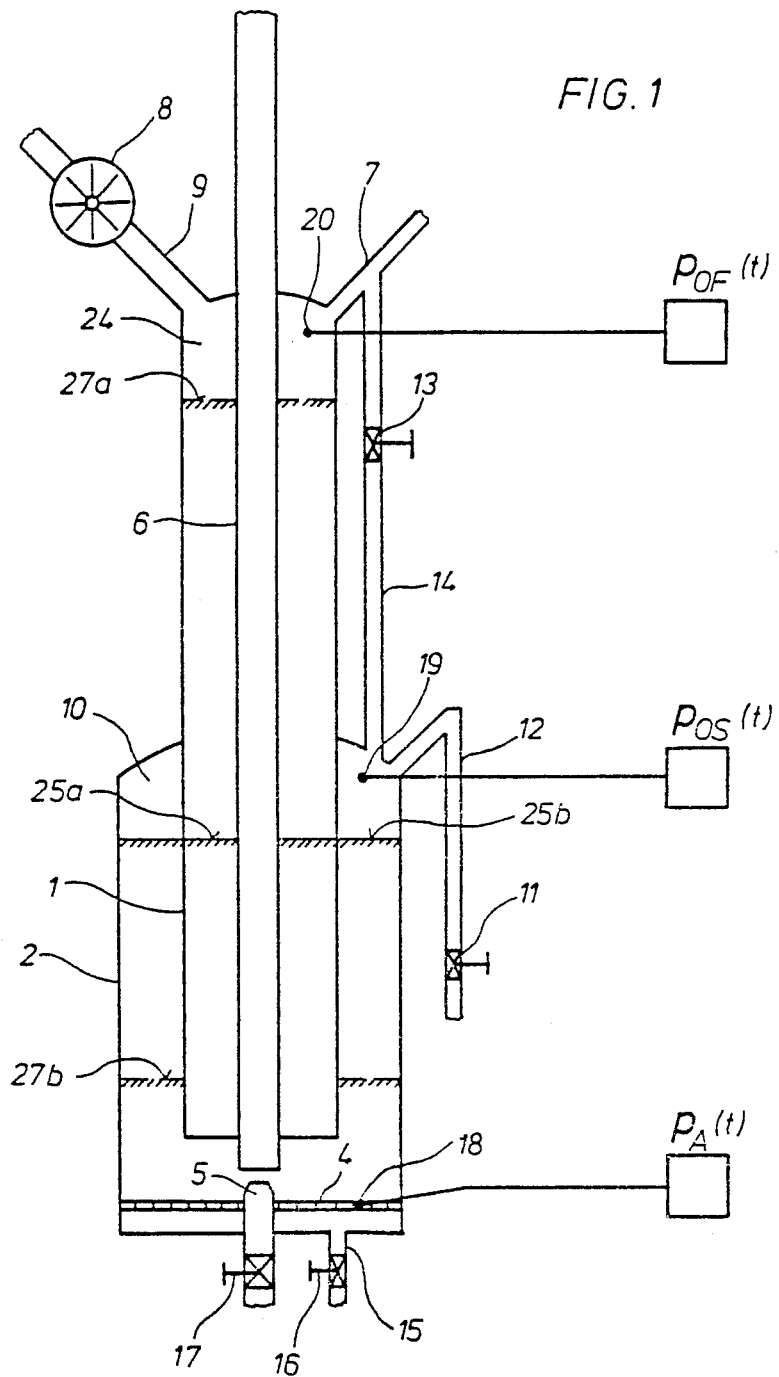
FIG. 1 shows a schematic representation of a pneumatic conveying arrangement in which the method according to the invention is used for determining the filling capacity and for calibrating it.

The pneumatic conveying arrangement according to FIG. 1 contains a conveyor vessel 1 and a storage vessel 2 which is of annular construction and arranged coaxially with respect to the conveyor vessel 2. The conveyor vessel 1, which is open at the lower end, is immersed in the storage vessel 2 and is connected thereto in the manner of communicating pipes.

The conveyor vessel 1 and the storage vessel 2 are provided with a common pneumatic aerating base 4. A conveyor nozzle 5 is passed through the aerating base 4 and above this nozzle is located the inlet opening of a pneumatic conveying pipe 6 which passes through the conveyor vessel 1 in the vertical direction.

A vent connection 7 and a material supply connection 9 provided with a bucket wheel charging valve 8 are provided in the upper region of the conveyor vessel 1.

The upper region 10 of the storage vessel 2 which is filled with air is connected to an air supply connection 12 which can be regulated by a valve 11 and to an air exhaust connection 14 which can be regulated by a valve 13.

The space below the aerating base 4 is provided with an air supply connection 15 in which a constant quantity regulating valve 16 is arranged. A further such valve 17 is arranged before the conveyor nozzle 5.

Three pressure measuring probes 18, 19, 20 are also provided, of which the pressure measuring probe 18 measures the conveying pressure $p_A(t)$, the pressure measuring probe 19 measures the top pressure $p_{OS}(t)$ prevailing in in the upper region 10 of the storage vessel 2 and the pressure measuring probe 20 measures the top pressure $p_{OF}(t)$ prevailing in the upper region 24 of the conveying vessel 1. The term "top pressure" means that pressure existing at any given time in the upper regions 10 and 24 as measured by probes 19 and 20, respectively.

The pneumatic conveying arrangement illustrated in FIG. 1 functions as follows in operation:

If atmospheric pressure prevails in the upper region 10 of the storage vessel 2 (as well as above the vent conntion 7 also in the upper region 24 of the conveyor vessel 1), then the material in the conveyor vessel 1 and in the storage vessel 2 has the same filling height (filling level 25a, 25b). The pneumatic aerating pressure below the aerating base 4 and the approximately equal pneumatic pressure at the conveyor nozzle 5 correspond to the filling level in the conveyor vessel 1 or a certain conveying capacity. A quantity of material equal to the quantity discharged via the conveying pipe 6 is fed into the conveyor vessel 1 via the material supply connection 9.

If fluctuations occur for any reason in the material supply, then the filling level in the conveyor vessel 1 is kept at the predetermined level by transferring material from the storage vessel 2 to the conveyor vessel 1 in the event of any reduction in the filling level in the conveyor vessel 1. This is achieved by increasing the pressure $p_{OS}(t)$ in the upper region 10 of the storage vessel 2. If on the other hand the filling level in the conveyor vessel 1 rises above the value corresponding to the desired conveying capacity, then the pressure $p_{OS}(t)$ is reduced and as a result material is transferred from the conveyor vessel 1 to the storage vessel 2.

If the discharge capacity of the conveyor vessel 1 is to be increased rapidly, which necessitates a corresponding increase in the filling level in the conveyor vessel 1, a correspondingly high pressure is built up in the upper region 10 of the storage vessel 2 so that the filling level 27b is produced in the storage vessel 2 and a filling level 27a is produced in the conveyor vessel 1. If a higher conveying capacity is required, material is pushed suddenly from the storage vessel 2 into the conveyor vessel 1. Alternatively, if it is desired to reduce the discharge capacity of the conveyor vessel 1 material is rapidly transferred from the conveyor vessel 1 to the storage vessel 2 by releasing the pressure in the storage vessel 2 (opening the valve 13).

The way in which the filling capacity of the pneumatic conveying arrangement is determined will now be explained below (this determination of the filling capacity is an integral part of the method of calibrating the pneumatic conveying arrangement which is described below). With regard to the symbols used in this description reference is made to the summary and explanation of the symbols at the end of the specification.

In the fluidized state of the material located in the pneumatic conveying arrangement the conveying pressure $p_A(t)$ can be equated approximately with the product of the filling level and the material bulk weight plus top pressures.

Disturbance variables such as wall friction, resistance to flow and incomplete fluidization are taken into account when determining the conveying pressure $p_A(t)$. The cross-sectional area $A_S$ of the storage vessel 2 and the cross-sectional area $A_F$ of the conveyor vessel 1 are constant over the entire material height. Thus the filling capacity $m(t)$ of the pneumatic conveying arrangement can be calculated as follows:

$$m(t) = m_S(t) + m_F(t) \quad (1)$$

$$m_S(t) = A_S \cdot h_S(t) \cdot \gamma_S \quad (2)$$

$$m_F(t) = A_F \cdot h_F(t) \cdot \gamma_F \quad (3)$$

The conveying pressure $p_A(t)$ can be expressed as follows:

$$p_A(t) = h_S(t) \cdot \gamma_S + p_{OS}(t) \quad (4)$$

$$p_A(t) = h_F(t) \cdot \gamma_F + p_{OF}(t) \quad (5)$$

The equations (2), (3), (4) and (5) result in $$m_S(t) = A_S \cdot [p_A(t) - p_{OS}(t)] \quad (6)$$

$$m_F(t) = A_F \cdot [p_A(t) - p_{OF}(t)] \quad (7)$$

$$m(t) = A_S \cdot [p_A(t) - p_{OS}(t)] + A_F \cdot [p_A(t) - p_{OF}(t)] \quad (8)$$

Since the cross-sectional areas $A_S$ and $A_F$ are known, the filling capacity $m(t)$ of the pneumatic conveying arrangement can be determined by measuring the pressures $p_A(t)$, $p_{OS}(t)$ and $p_{OF}(t)$ according to equation (8).

Based upon the determination of the filling capacity as described above, a simple filling capacity control circuit can be constructed which keeps a desired filling weight constant by measuring the three pressures $p_A(t)$, $p_{OS}(t)$ and $p_{OF}(t)$ and adjusting the quantity of material delivered. By controlling the top pressure $p_{OS}(t)$ with the aid of the valves 11 and 13 the differential pressure $p(t)$ and with it the conveying capacity is regulated.

It will also be explained below how the pneumatic conveying arrangement can be calibrated using the method described here for determining the filling capacity.

Figure 2:
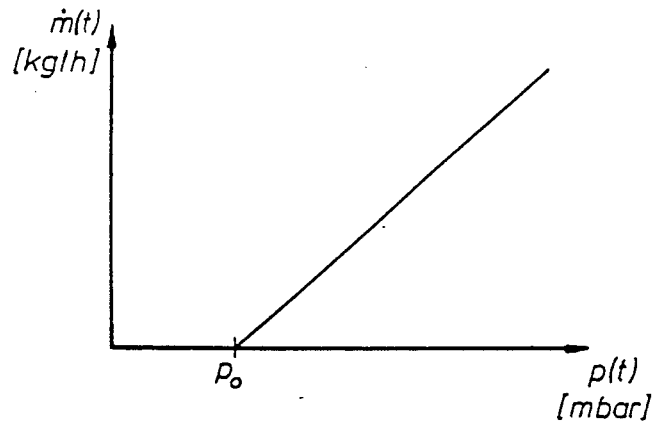
FIGS. 2 to 4 show diagrams to explain the calibrating method.

In the tests on which the invention is based it was established that there is a linear dependence between the differential pressure $p(t)$ and the conveying capacity $\dot{m}(t)$ as shown in FIG. 2, the differential pressure $p_o$ being constant during conveying. The inclination of the straight lines is designated below as the calibration factor k.

According to FIG. 2 the following relationship exists between the conveying capacity $\dot{m}(t)$, the calibration factor k, the differential pressure $p(t)$ and the differential pressure $p_o$:

$$\dot{m}(t) = k \cdot [p(t) - p_o] \quad (10)$$

It is the object of the calibration to determine the unknown calibration factor k. $p_o$ is determined once during starting.

For calibration the delivery of material to the conveyor vessel 1 (via the material supply connection 9) is interrupted. The filling level in the conveyor vessel 1 corresponding to the conveying capacity just required is kept constant in the manner already explained by controlling the pressure in the upper region 10 of the storage vessel 2. Thus during the calibration the supply of material to the conveyor vessel 1 takes place exclusively via the storage vessel 2.

The reduction in the filling capacity $m(t)$ over the time t is a measurement for the conveying capacity:

$$\dot{m}(t) = -\frac{dm}{dt} \quad (11)$$

Figure 3:
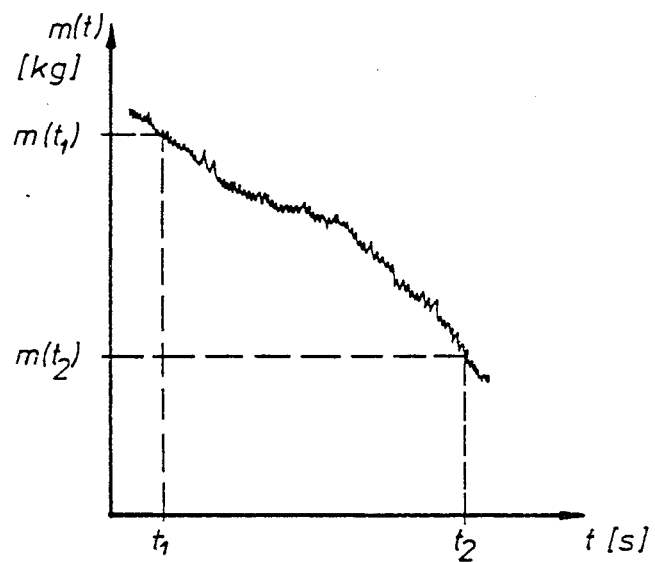

FIG. 3 shows the reduction in the filling capacity $m(t)$ occurring during the calibration operation. It is assumed here that the calibration begins at the time $t_1$ and ends at the time $t_2$. The filling capacity at the beginning of the calibration operation is $m(t_1)$ and at the end $m(t_2)$. The equations (10) and (11) result in:

$$-\frac{dm}{dt} = k \cdot [p(t) - p_o] \quad (12)$$

It follows from this that $$-\int_{t_1}^{t_2} dm = k \cdot \int_{t_1}^{t_2} [p(t) - p_o] \, dt \quad (13)$$

$$-[m(t_2) - m(t_1)] = \Delta m = k \cdot \int_{t_1}^{t_2} [p(t) - p_o] \, dt \quad (14)$$

If the integration of the pressure value $p(t)$ over the time is carried out by means of numeric integration in n sensing steps, then the equation (14) can be written as follows:

$$\Delta m = k \cdot \Delta t \cdot \left( \sum_{i=1}^{n} p_i - n p_o \right) \quad (15)$$

In this equation (15) k and $p_o$ are unknown. On starting the unknown quantity $p_o$ must be determined as follows.

In the case of two different conveying capacities the differences in the conveying capacities $\Delta m_1$ and $\Delta m_2$ and and the integrals of the appertaining pressure values $\Sigma p_i$ and $\Sigma p_j$ respectively are determined.

$$\Delta m_1 = k \cdot \Delta t \cdot \left( \sum_{i=1}^{n_1} p_i - n_1 p_o \right) \quad (16)$$

$$\Delta m_2 = k \cdot \Delta t \cdot \left( \sum_{j=1}^{n_2} p_j - n_2 p_o \right) \quad (17)$$

It follows from (16) and (17) that:

$$p_o = \frac{\Delta m_2 \cdot \sum_{i=1}^{n_1} p_i - \Delta m_1 \cdot \sum_{j=1}^{n_2} p_j}{\Delta m_2 \cdot n_1 - \Delta m_1 \cdot n_2} \quad (18)$$

Thus the calibration factor k which is sought is produced from the equation (15) as follows:

$$k = \frac{\Delta m}{\Delta t \cdot \sum_{i=1}^{n} (p_i - p_o)} \qquad (19)$$

Figure 4:
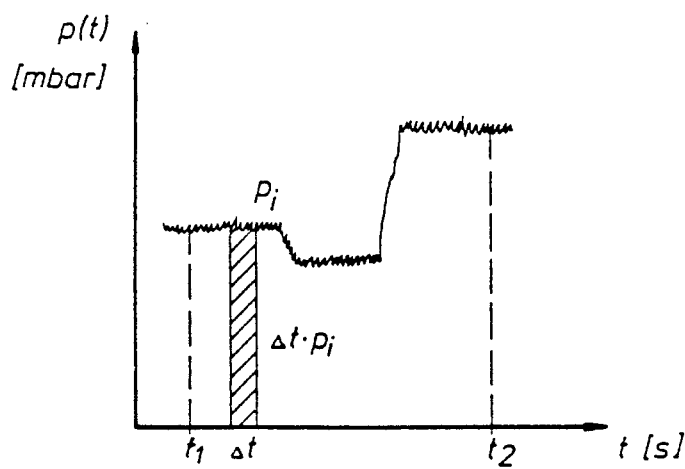

FIG. 4 shows a possible course of the differential pressure p(t) during the calibration operation, in which, it is assumed that two alterations in the conveying capacity are made during calibration.

The theoretical value and the actual value or only the actual value of the conveying capacity is corrected with the calibration factor k thus obtained.

At the beginning and the end of the calibration operation the filling capacity signal is checked for any greater signal fluctuations based on external disturbance. Thus the integration of the differential pressure value p(t) at $t_1$ only begins—taking the filling capacity $m(t_1)$ existing at the beginning of the calibration—after the filling capacity has fallen approximately evenly (at a constant rate) during a predetermined time span after interruption of the material supply (cf. FIG. 3). The integration of the differential pressure value p(t) is only ended—and simultaneously the filling capacity $m(t_2)$ existing at that time is taken—when a minimum quantity $\Delta m_{KAL}$ has been taken off and the filling capacity has fallen approximately evenly during a predetermined further time span. When the filling capacity falls below a predetermined filling capacity $m_{min}$ the calibration is interrupted.

SUMMARY OF THE SYMBOLS USED (a) Determining the filling capacity m(t): filling capacity of the conveying arrangement
$m_S(t)$: filling capacity in the storage vessel
$m_F(t)$: filling capacity in the conveyor vessel
$A_S$: cross-sectional area of the storage vessel
$A_F$: cross-sectional area of the conveyor vessel
$h_S(t)$: material filling level in the storage vessel
$h_F(t)$: material filling level in the conveyor vessel
$\gamma_S$: material bulk weight in the storage vessel
$\gamma_F$: material bulk weight in the conveyor vessel
$p_A(t)$: conveying pressure as a function of the time t (air pressure before the conveyor nozzle 5 or pressure below or above the aerating base 4)
$p_{OF}(t)$: top pressure in the conveyor vessel $p_{OS}(t)$: top pressure in the storage vessel (b) Calibration $\dot{m}(t)$: conveying capacity as a function of the time t
p(t): differential pressure as a function of the time t; differential pressure between the conveying pressure $p_A(t)$ and the pressure at the end of the conveying pipe $p_E(t)$
$p_E(t)$: pressure at the end of the conveying pipe as a function of the time t (air pressure at the end of the conveying pipe or at the receiving location)
$p_o$: differential pressure p(t) at $\dot{m}(t) = 0$
$p_i$: values of p(t) at the n sensing times between i=1 and i=n
k: calibration factor (inclination of the straight lines)
dm/dt: alteration in the filling capacity over the time t $m(t_1)$: filling capacity at the beginning of the calibration (time $t_1$)
$m(t_2)$: filling capacity at the end of the calibration (time $t_2$)
$\Delta m$: $m(t_1) - m(t_2)$
$\Delta m_{KAL}$: minimum quantity which can be taken off during calibration
$\Delta t$: time between two sensing steps
n: number of sensing steps during calibration
$m_{min}$: minimum filling capacity; when the filling capacity falls below the minimum filling capacity the calibration operation is stopped.

What is claimed is:

1. The method of determining the filling capacity (m(t)) of pneumatic conveying apparatus having a storage vessel having a known cross-sectional area ($A_s$), a conveyor vessel having a known cross-sectional area ($A_F$), the storage and conveyor vessels being connected to one another by communicating pipes and having a common pneumatic aerating base, a conveying pressure supply, and top pressure regulating means in both of said vessels, said method comprising:

(a) measuring the conveying pressure ($P_A(t)$);
    (b) measuring the top pressure ($P_{OS}(t)$) in the storage vessel;
    (c) measuring the top pressure ($P_{OF}(t)$) in the conveyor vessel; and
    (d) solving the equation:

$$m(t) = A_s(P_A(t) - P_{OS}(t)) + A_F(P_A(t) - P_{OF}(t)).$$

2. A method of calibrating pneumatic conveying apparatus whose filling capacity has been determined by the method of claim 1 wherein:

a. the calibration of the apparatus occurs with the material supply interrupted by numeric integration of the differential pressure (p(t)) between the conveying pressure ($p_A(t)$) and the pressure ($p_E(t)$) at the end of the conveying pipe and by determining the reduction ($m(t_2) - m(t_1)$) in the filling capacity occurring in the time span ($t_2 - t_1$); and wherein b. the taking of the filling capacity ($m(t_1)$) at the beginning of the calibration and the start of the integration of the pressure value (p(t)) occur only after the filling capacity has fallen after interruption of the material supply during a predetermined time span.

3. The method according to claim 2 wherein the integration of the pressure value (p(t)) is ended and the filling capacity ($m(t_2)$) which exists at that time is taken only when a minimum quantity $\Delta m_{KAL}$ is taken off and the filling capacity has fallen during a predetermined further time span.

4. The method according to claim 2 wherein the calibration is stopped when the filling capacity falls below a predetermined value ($m_{min}$).

5. The method according to claim 2 including obtaining a calibration factor (k) and altering the actual value of the conveying capacity according to said calibration factor (k).

6. The method according to claim 2 including obtaining a calibration factor (k) and altering the theoretical value and the actual value of the conveying capacity according to said calibration factor (k).

* * * * *